United States Patent [19]

Brunel

[11] Patent Number: 5,255,845
[45] Date of Patent: Oct. 26, 1993

[54] FUEL INJECTION DEVICE FOR INTERNAL COMBUSTION ENGINES

[75] Inventor: Andre Brunel, St. Genis Laval, France

[73] Assignee: Robert Bosch GmbH, Stuttgart, Fed. Rep. of Germany

[21] Appl. No.: 882,796

[22] Filed: May 14, 1992

[30] Foreign Application Priority Data

May 31, 1991 [DE] Fed. Rep. of Germany ....... 4117809

[51] Int. Cl.$^5$ ............................................. F02M 47/02
[52] U.S. Cl. ...................................................... 239/90
[58] Field of Search ...................................... 239/88-96

[56] References Cited

U.S. PATENT DOCUMENTS

| | | | |
|---|---|---|---|
| 2,378,165 | 6/1945 | Waeber | 239/90 |
| 2,951,693 | 9/1960 | Engel | 239/90 |
| 3,104,817 | 9/1963 | Vander Zee et al. | 239/90 |
| 4,378,774 | 4/1983 | Kato | 239/88 X |
| 4,393,847 | 7/1983 | May | 239/92 X |

FOREIGN PATENT DOCUMENTS 203864 11/1984 Japan ..................................... 239/88

Primary Examiner—Andres Kashnikow
Assistant Examiner—Kevin Weldon
Attorney, Agent, or Firm—Edwin E. Greigg; Ronald E. Greigg

[57] ABSTRACT

The invention relates to a fuel injection device for internal combustion engines and to a method for fuel injection. The invention is directed to an injection nozzle system that while having high intrinsic safety of an injection pump, in the case of electrically controlled pumps, assures fast element filling and simultaneously effective cooling of the injection nozzle as well. According to the invention, an additional final control element is provided between the pump work chamber and the pressure chamber of the injection nozzle and dependent upon the pressure in the pump work chamber the position of the final control element controls a direct fuel delivery path into the pump work chamber.

13 Claims, 1 Drawing Sheet

FUEL INJECTION DEVICE FOR INTERNAL COMBUSTION ENGINES

BACKGROUND OF THE INVENTION

The invention is based on a fuel injection device for internal combustion engines and on a method for fuel injection. In such fuel injection devices, the injection quantity is controlled either by control edges between the pump piston and the cylinder or by a magnet valve. In controls via a magnet valve, two basic systems are known for embodying the high-pressure circuit in high-pressure-controlled unit fuel injectors.

In one system, filling of the pump work chamber takes place directly via a magnet valve. This has the advantage that the electrically controlled unit fuel injector is intrinsically safe even if the magnet valve fails, and even if that valve should remain in the closed state, because no fuel is injected since filling of the pump work chamber with fuel is no longer taking place.

In the other system, filling of the pump work chamber takes place via the injection nozzle and the magnet valve. This system offers the advantages of improved cooling of the nozzle and better stability of the nozzle opening and closing process, but on the other hand has the disadvantage of relatively long line paths between the magnet valve and the pump work chamber, which if they are overly long worsen the injection performance, since the pressure losses in this line become so relatively great that filling via the magnet valve can no longer be assured under all operating conditions. Moreover, in this design, to assure the rapid filling of the pump work chamber, this filling is also done via a separate filling bore, so the intrinsic safety attained in the first system is lost as well.

OBJECT AND SUMMARY OF THE INVENTION

The fuel injection device and the method for fuel injection according to the invention have an advantage over the prior art that while retaining the intrinsic safety of the electrically controlled unit fuel injector, fast filling of the pump work chamber is done over relatively short line paths, without requiring additional filling bores in the pump work chamber; moreover, the advantages of the second known system of filling, such as improved cooling of the nozzle and better stability of the nozzle opening and closing process, are retained.

In the unit fuel injector according to the invention, the aforementioned advantages of both systems are combined, while their disadvantages are avoided; filling of the pump work chamber of the electrically controlled unit fuel injector is performed via a separate line path, and this line path is interrupted by suitable closing means shortly before injection and remains interrupted during and shortly after the injection; only a single line path is kept open via the pressure chamber for fuel transport, and subsequently, once injection and pressure relief in the high-pressure side of the injection nozzle have taken place, the separate line path is again made available via a magnet valve, upon the opening of a fuel inlet path.

In an advantageous feature of the invention, the final control element is embodied as a hydraulically actuated slide that is provided with a compression spring acting counter to the pump work chamber; this spring has a spring constant that prevents a further direct delivery of fuel into the pump work chamber via the line path, by closure of the slide, if there is a pressure increase in the pump work chamber prior to the injection.

In another advantageous feature the aforementioned slide is embodied as a round piston, on which an annular groove is disposed that in the phase of pump work chamber filling comes to rest in the line path that enables the direct filling of the pump work chamber.

In another advantageous embodiment of the invention, it is also possible to embody this slide such that it has a blind bore with a radial inlet, which bore in turn communicates with the pump work chamber; in the phase of pump work chamber filling, this inlet comes to be located in the line path that enables the direct filling of the pump work chamber.

In another advantageous feature of the invention, the compression spring that loads the final control element is preferably supported on the spring chamber of the injection nozzle.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 4:
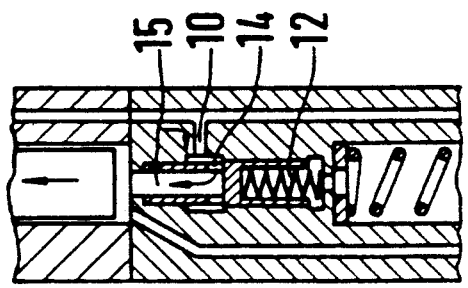
FIG. 4 shows a variant of the exemplary embodiment.

In the fuel injection device shown in the drawing, a pump piston 2 of a unit fuel injector is supplied with fuel from a fuel tank via a feed pump 16; a magnet valve 8, by which the delivered fuel quantity is controlled, is disposed in a fuel inlet line 9.

The pump piston 2 is actuated via a cam, not shown, counter to the force of a spring, likewise not shown. From the pump work chamber 1, a pressure line 6 leads to a pressure chamber 7 in which a valve needle 5 travels; if there is adequately high injection pressure, this valve needle is displaced counter to the force of a closing spring 4 in the spring chamber 17 and in so doing opens the injection port.

Figure 1:
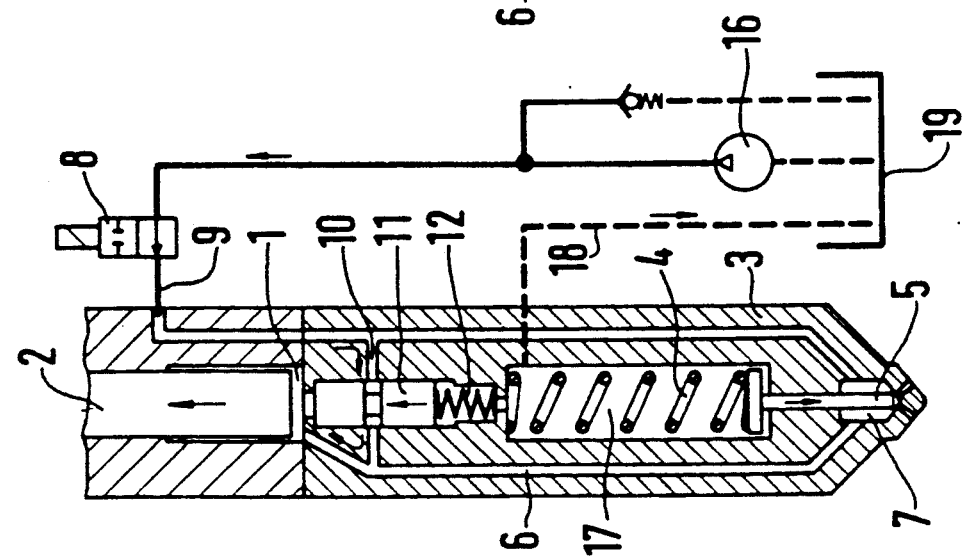
FIG. 1 provides both a longitudinal section through a unit fuel injector and the line layout with the position of the final control element according to the invention in the phase for filling the pump work chamber.

According to the invention, a direct delivery path 10 disposed in the immediate vicinity of the pump work chamber 1 is created, branching off from the fuel inject line 9; this delivery path can be closed by means of a final control element 11. The final control element 11 is embodied in FIGS. 1-3 as a round piston, with an annular groove 13 disposed in its jacket face. The final control element 11 is pressed in the direction of the pump work chamber 1 by the force of a compression spring 12.

FIG. 4 shows a variant of the final control element 11, in which the delivery of fuel to the pump work chamber 1 takes place via the direct fuel delivery path 10 by means of the final control element via a radial inlet 14 in the jacket face, into a blind bore 15 of the final control element, this bore being open toward the pump work chamber 1.

A return line 18 serves to return the leakage to a supply tank 19; it is not under pressure the way the pressure line 6 is.

The injection device according to the invention functions as follows: In the phase of filling the pump work chamber 1, shown in FIG. 1, the piston 2 travels backward, and a negative pressure prevails in the pump work chamber 1; fuel is pumped into the fuel inlet line path 9 through the opened magnet valve 8, by means of the feed pump 16. The final control element 11 is at that time in a position that enables the direct filling of the pump work chamber 1 via the fuel delivery path 10 and the annular groove 13, or as shown in FIG. 4 via the radial inlet 14 and the blind bore 15 in the final control element 11. Because of these short inlet paths, accelerated filling of the pump work chamber 1 with fuel is assured.

Figure 2:
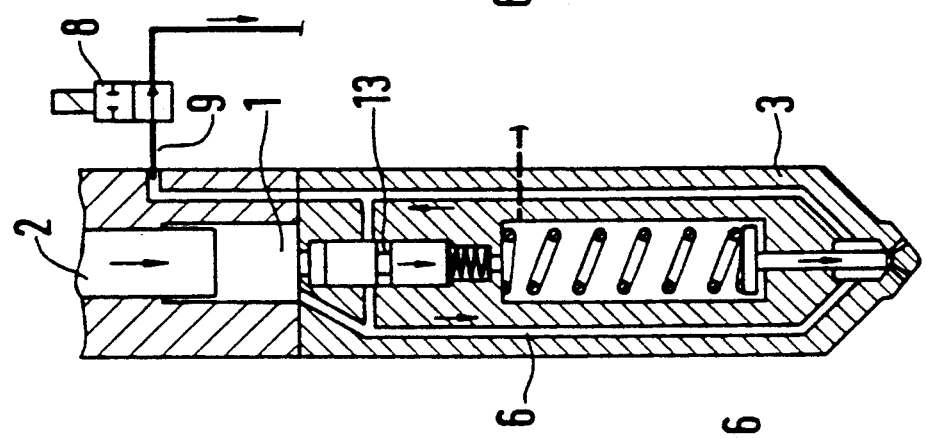
FIG. 2 shows the unit fuel injector with the final control element position before and after injection has taken place.

In FIG. 2, the position of the final control element 11 in the phase before and after injection is shown; the piston 2 travels forward. The acceleration of the cam (not shown) that is exerted upon the pump piston 2 increases the pressure in the pump work chamber. One effect of this pressure increase is to displace the final control element 11 counter to the force of a compression spring 12, which should be dimensioned accordingly, so that the direct fuel delivery path is closed, and the fuel can now flow out only via the pressure line 6. In this phase prior to the injection—or after it—the magnet valve 8 has not yet closed, so that some of the fuel can flow via the pressure chamber 7 as indicated by the arrow and thus effects a cooling of the injection nozzle 3.

Figure 3:
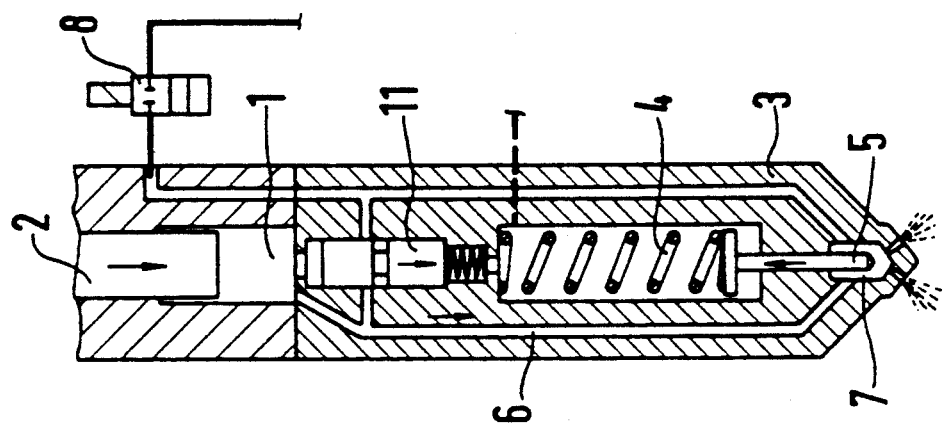
FIG. 3 shows the unit fuel injector in the position during the injection.

In FIG. 3, the final control element 11 assumes the same position as in FIG. 2, but the magnet valve 8 has closed, so that by means of a further upward motion of the cam, not shown, a further pressure increase takes place in the pump work chamber 1, the pressure lines and the pressure chamber 7, until finally the valve needle 5 is lifted counter to the force of the closing spring 4 and the injection can thus ensue.

Once the magnet valve 8 has opened again after injection, a pressure relief of the high-pressure side takes place by an outflow of fuel via the pressure line 6. Because the pressure in the pump work chamber 1 has now dropped as well and because of the motion of the pump piston to the bottom dead center position of the cam, the final control element 11 is returned to the outset position by the force of the compression spring 12, which is preferably supported on the spring chamber 17, and the capability of inflow of fuel via the path 10 into the pump work chamber 1 is again provided.

Because the final control element 11 is embodied in accordance with the invention, the pressure waves in the high-pressure circuit that may arise have no influence on the position of the final control element in the closed state. The provisions of the invention enable favorable filling of the pump work chamber 1, while pressure losses can be kept small, as well as adequate cooling of the injection nozzle, without requiring additional filling of the pump work chamber that would not be done via the magnet valve. The invention therefore creates an embodiment that combined in itself the known individual advantages of the two systems in the prior art discussed above, without having their disadvantages.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the U.S. is:

1. A fuel injection device for internal combustion engines,
   having an injection pump with a pump chamber in a housing;
   an injection nozzle in the housing, a valve needle loaded by a closing spring for controlling injection ports branching off from a pressure chamber (7);
   a pressure line between the pump work chamber and the pressure chamber; and
   an electromagnetic valve that controls a fuel flow via a fuel inlet line (9) to the pump work chamber;
   an additional final control element is provided which controls a direct fuel delivery path (10) via the fuel inlet line (9) into the pump work chamber (1) and said delivery path is closed by a rising pressure in the pump work chamber (1) against a compression spring (12).

2. A fuel injection device for internal combustion engines as defined by claim 1, in which the final control element (11) is embodied as a mechanical slide, which is loaded by said compression spring (12) acting upon said mechanical slide counter to the pressure of the pump work chamber (1), said compression spring has a spring constant that upon a pressure increase in the pump work chamber (1) prior to the injection prevents a further direct delivery of fuel into the pump work chamber (1) via the delivery path (10) by closing the line path (10).

3. A fuel injection device for internal combustion engines as defined by claim 1, in which the mechanical slide (11) is embodied as a round piston, on which an annular groove (13) is disposed, said annular groove (13) in a phase of filling the pump work chamber (1) comes to be located in alignment with the delivery path (10) and thus enables a direct filling of the pump work chamber (1).

4. A fuel injection device for internal combustion engines as defined by claim 2, in which the mechanical slide (11) is embodied as a round piston, on which an annular groove (13) is disposed, said annular groove (13) in a phase of filling the pump work chamber (1) comes to be located in alignment with the delining path (10) and thus enables a direct filling of the pump work chamber (1).

5. A fuel injection device for internal combustion engines as defined by claim 1, in which the compression spring (12) that loads the final control element (11) is supported on a spring chamber (17).

6. A fuel injection device for internal combustion engines as defined by claim 2, in which the compression spring (12) that loads the final control element (11) is supported on a spring chamber (17).

7. A fuel injection device for internal combustion engines as defined by claim 1, in which the final control element (11) communicates via the delining path (10) with a low-pressure circuit via the fuel inlet line (9).

8. A fuel injection device for internal combustion engines as defined by claim 2, in which the final control element (11) communicates via the delining path (10) with a low-pressure circuit via the fuel inlet line (9).

9. A fuel injection device for internal combustion engines as defined by claim 3, in which the final control element (11) communicates via the delining path (10) with a low-pressure circuit via the fuel inlet line (9).

10. A fuel injection device for internal combustion engines as defined by claim 5, in which the final control element (11) communicates via the delining path (10) with a low-pressure circuit via the fuel inlet line (9).

11. A fuel injection device for internal combustion engines,
   having an injection pump with a pump work chamber in a housing;
   an injection nozzle in the housing, a valve needle loaded by a closing spring for controlling injection ports branching off from a pressure chamber (7);
   a pressure line between the pump work chamber and the pressure chamber; and
   an electromagnetic valve that controls a fuel flow via a fuel inlet line to the pump work chamber;
   an additional final control element (11) is provided between the pump work chamber (1) and the pressure chamber (7) of the injection nozzle (3), said final control element (11), has a blind bore (15) with a radial inlet (14) in a wall of said blind bore, said blind bore in turn communicates with the pump work chamber (1), a position of said final control element is dependent upon a pressure in the pump work chamber (1) and controls a direct fuel delivery path (10) via the fuel inlet line (9) into the pump work chamber (1), and said radial inlet becomes located in alignment with the fuel delivery path (10) in a phase of filling the pump work chamber (1) and thus enables a direct filling of the pump work chamber (1).

12. A fuel injection device for internal combustion engines as defined by claim 11, in which the final control element (11) communicates via the delining path (10) with a low-pressure circuit via the fuel inlet line (9).

13. A fuel injection device for internal combustion engines as defined by claim 12, in which the final control element (11) is embodied as a mechanical slide, which is loaded by said compression spring (12) acting upon said mechanical slide counter to the pressure of the pump work chamber (1), said compression spring has a spring constant that upon a pressure increase in the pump work chamber (1) prior to the injection prevents a further direct delivery of fuel into the pump work chamber (1) via the delining path (10) by closing the delining path (10).

* * * * *